United States Patent [19]

Omura et al.

[11] Patent Number: 5,124,830

[45] Date of Patent: Jun. 23, 1992

[54] OPTICAL DEFLECTOR DEVICE FOR DEFLECTING LASER BEAM

[75] Inventors: Ken Omura; Takashi Shiraishi, both of Tokyo; Naruhito Yoshida, Yokohama, all of Japan

[73] Assignee: Kabushiki Kaisha Toshiba, Kawasaki, Japan

[21] Appl. No.: 620,633

[22] Filed: Dec. 3, 1990

[30] Foreign Application Priority Data

Dec. 7, 1989 [JP] Japan ................. 1-316379

[51] Int. Cl.$^5$ ............................................. G02B 26/10
[52] U.S. Cl. ..................................... 359/219; 359/212
[58] Field of Search ............... 359/212, 216, 218, 220, 359/217, 219

[56] References Cited

U.S. PATENT DOCUMENTS

| | | | |
|---|---|---|---|
| 4,357,071 | 11/1982 | Markel et al. | 359/218 |
| 4,623,216 | 11/1986 | Sato et al. | 359/216 |
| 4,756,586 | 7/1988 | Witteveen | 359/218 |
| 4,820,005 | 4/1989 | Hashimoto et al. | 359/218 |
| 4,836,631 | 6/1989 | Shimazu et al. | 359/218 |
| 4,875,748 | 10/1989 | Matsumoto et al. | 359/218 |

*Primary Examiner*—Loha Ben
*Attorney, Agent, or Firm*—Foley & Lardner

[57] ABSTRACT

An optical deflector is employed in an optical unit incorporated in a laser beam printer. The optical deflector reflects a laser beam, which is emitted by a laser diode and is made to have a cross section of desirable size by a group of conversion lenses, toward a photosensitive body. The optical deflector contains a polygonal mirror having four or eight reflecting surfaces. Each of these reflecting surfaces has a cross section which is convex in a main scanning direction. The polygonal mirror is adhered to the shaft of a motor used for rotating the polygonal mirror. Alternatively, it is adhered to the base member fixed to the shaft.

7 Claims, 3 Drawing Sheets

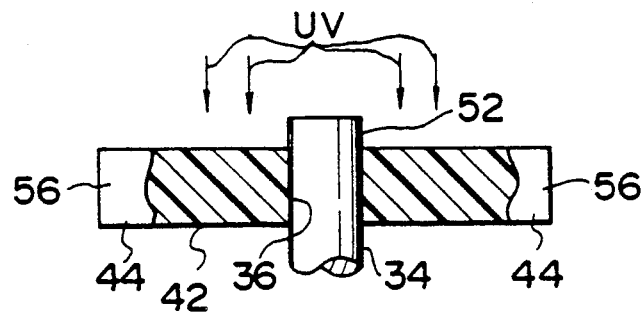
F I G. 4A
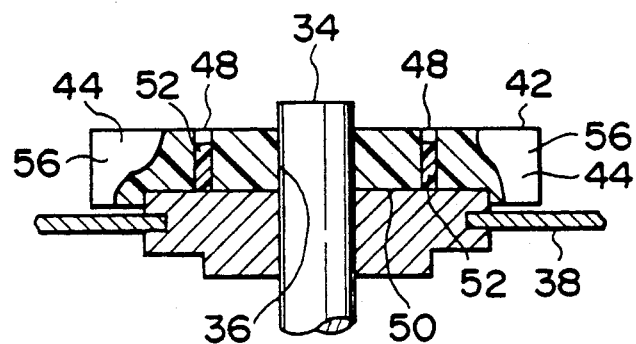
F I G. 4B
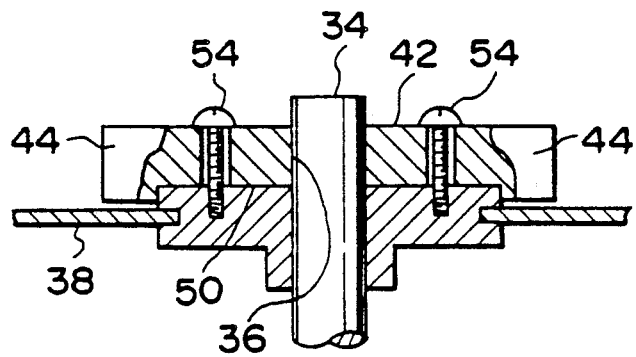
F I G. 4C

OPTICAL DEFLECTOR DEVICE FOR DEFLECTING LASER BEAM

BACKGROUND OF THE INVENTION

1. Field of the Invention

The present invention relates to an optical deflector which is incorporated in an optical unit of a laser beam printer or the like and which deflects and guides a laser beam emitted by a laser diode to an object to be scanned.

2. Description of the Related Art

In general, an optical unit incorporated in a laser beam printer or the like is designed such that a laser beam output from a laser diode is guided first to a scanner or an optical deflector and then to a photosensitive body, i.e., an object to be scanned. The photosensitive body is scanned with the laser beam at a constant speed. When guided from the laser diode to the photosensitive body, the laser beam passes through a group of focusing lenses. The focusing lenses alter the laser beam to have a desirable cross sectional shape, and then direct the laser beam to a predetermined position on the surface of the photosensitive body.

In this type of optical unit, the optical deflector includes a polygonal mirror having a plurality of non-planar mirror surfaces, for example, four or eight mirror surfaces. When the polygonal mirror is rotated, the optical deflector reflects the laser beam toward the photosensitive body at a nonuniform angular velocity.

With respect to the polygonal mirror of the above-mentioned type, it is known that the width of the line to be scanned with the laser beam that is deflected by one mirror surface, i.e., the width of the scanned line on the photosensitive body in the main scanning direction during one scan, is very narrow. The width of the line to be scanned is in the range of several tens of $\mu m$ to 100 $\mu m$ or so. Therefore the polygonal mirror must be coupled to the shaft of the motor very accurately. To do this the polygonal mirror is first pressed against a base member (a fixing member) of the shaft of the motor and is then secured thereto by use of a leaf spring (a pressing member).

However, the leaf spring is hard to design because the polygonal mirror must be pressed very strongly against the base member of the motor shaft. In addition, because the leaf spring is kept strongly pressed at all times, the force it produces may vary with time. The leaf spring must be designed in accordance with such a force variation, as well. These problems result in an increase in the manufacturing cost of the optical deflector.

SUMMARY OF THE INVENTION

Accordingly, an object of the present invention is to provide an optical deflector containing a polygonal mirror fixed to the shaft of a motor very accurately.

Another object of the present invention is to provide a method for fixing a polygonal mirror to the shaft of a motor very accurately.

Still another object of the present invention is to provide an optical unit which is compact in size.

According to the present invention, there is provided an optical deflector which deflects a laser beam and which comprises: a reflecting means for reflecting the laser beam, the reflecting means having a through hole formed in the center thereof and including a non-planar reflecting surface; a shaft element to which the reflecting means is fixed by adhesion; and a means for rotating the shaft element.

BRIEF DESCRIPTION OF THE DRAWINGS

FIGS. 4A through 4C are schematic views showing other modifications of the process illustrated in FIG. 2.

DETAILED DESCRIPTION OF THE PREFERRED EMBODIMENTS

Figure 1:
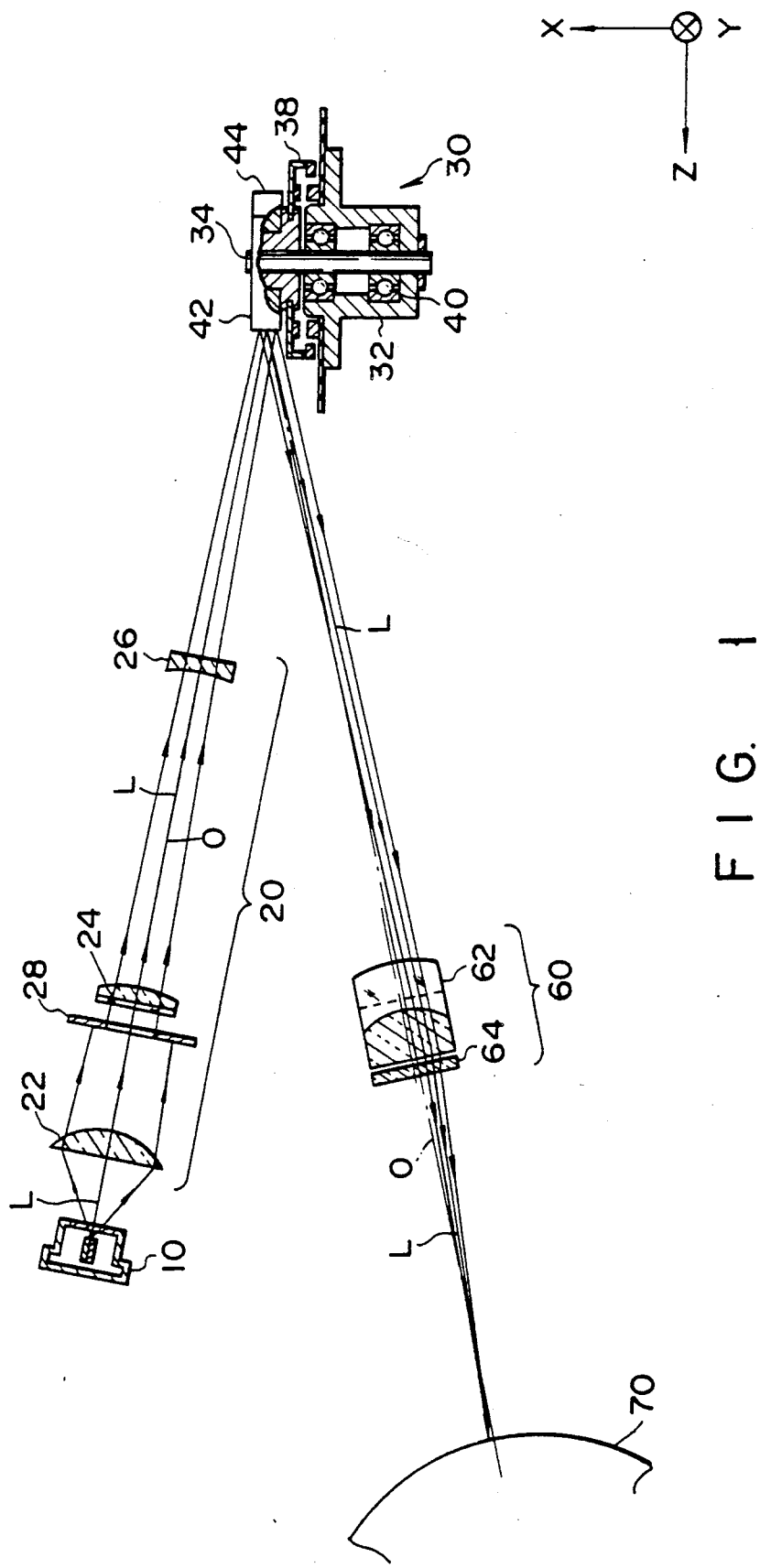
FIG. 1 illustrates one embodiment of the present invention and is a sectional view showing how the optical components are arranged and how the optical paths are determined in an optical unit in a laser beam printer, the sectional view obtained by sectioning the optical unit along a plane in the vicinity of the optical axis center determined with reference to a main scanning direction.

In FIG. 1, the laser beam L generated by the laser diode 10 converges when it passes through the first optical system 20. The laser beam L is directed to the scanner 30, which reflects the laser beam L toward the photosensitive body 70, where the laser beam L scans the photosensitive body 70 at a nonuniform angular velocity. The laser beam L reflected by the scanner 30 is directed first to the second optical system 60. The laser beam L is focused on a desirable point on the surface of the photosensitive body 70 by the second optical system 60. The laser beam L moves over the photosensitive body 70 in the main scanning direction. The second optical system 60 keeps the laser beam L focused as the reflecting surface of the scanner 30 rotates. The distance over which the laser beam L moves in the main scanning direction from the center of the optical axis to a given point corresponds to the angle of rotation of the surface of the scanner 30. The laser beam L, focused on the photosensitive body 70, is modified or ON-OFF controlled by additional units such as a beam modulator, a data input circuit, etc., (not shown) to form character data and/or graphics data on the surface of the photosensitive body 70. Therefore, an electrostatic latent image is formed on the surface of the photosensitive body 7.

The photosensitive body 70 is rotated in a predetermined direction by a driver (not shown). The electrostatic latent image is formed in accordance with the rotation of the photosensitive body 70. The electrostatic latent image, thus formed, is developed by a developing means (not shown), and is then transferred onto a given transferring material (not shown).

Part of the laser beam L passing through the second optical system 60 is reflected by a horizontal synchronization-detecting mirror (not shown) at each scan performed in the main scanning direction. The reflected laser beam L is guided to a synchronization signal detector (not shown), for the detection of horizontal synchronization.

The scanner 30 contains a polygonal mirror 42 having four or eight mirror surfaces 44 which reflect a laser beam L. Each of the mirror surface 44 has a cross section which is convex in the main scanning direction. The polygonal mirror 42 is fixed to the rotor 38 of a motor 32 either by bond or with screws, after being accurately positioned with reference to the rotor 38.

The rotor 38 is integral with a motor shaft 34, and the rotor 38 and the motor shaft 34 are supported by a bearing 40 or the like in such a manner as to be smoothly rotatable.

The laser beam L generated by the laser diode 10 is converged or collimated by the glass lens 22. When passing through the stop 28, the laser beam L is shaped to have a predetermined cross section. The laser beam L emerging from the stop 28 is guided to the first plastic lens 24. When passing through the first plastic lens 24, the laser beam L is collimated in the main scanning direction and is converged in the sub-scanning direction. The laser beam L, thus processed, is then directed to the second plastic lens 26. When passing through the second plastic lens 26, the laser beam L is converged in both the main scanning direction and sub-scanning direction.

The laser beam L emerging from the second plastic lens 26 is directed to one deflecting mirror surface 44 of the polygonal mirror 42 of the scanner 30. After being reflected by the deflecting mirror surfaces 44, the laser beam L is directed at a nonuniform angular velocity to the third plastic lens 62, which functions as a kind of fθ lens, as mentioned above. In the main scanning direction, the third plastic lens 62 suppresses the adverse effects caused by the field curve and corrects the distortion aberration to a desirable value. In the sub-scanning direction, the third plastic lens 62 corrects the positional shift of the laser beam L on the photosensitive body 70, even if each mirror surface 44 of the polygonal mirror 42 tilts. The laser beam L emerging from the third plastic lens 62 is directed to the photosensitive body 70 by way of the dust-preventing cover 64.

Figure 2:
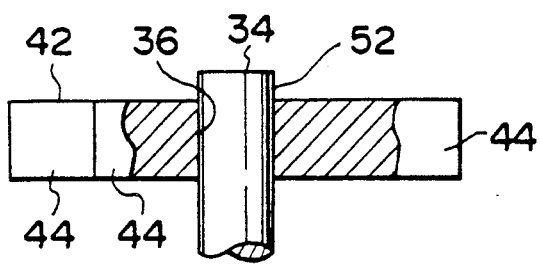
FIG. 2 is a schematic view showing a process in which the shaft of a motor and a polygonal mirror are fixed to each other.

FIG. 2 shows an example of one manner in which the motor shaft 34 and the polygonal mirror 42 are bonded to each other. The polygonal mirror 42 has a hole 36 formed in the center thereof. The motor shaft 34 is inserted into the hole 36, and the very narrow gap (not shown) between the two is filled with an adhesive 52. This adhesive 52 may be of any kind commercially available, and is exemplified by an instantaneous adhesive, a two-part adhesive, an ultraviolet-curing adhesive (hereinafter referred to as a UV-curing adhesive), or the like. The instantaneous adhesive is preferably of a type that does not become opaque after it sets.

Figure 3A:
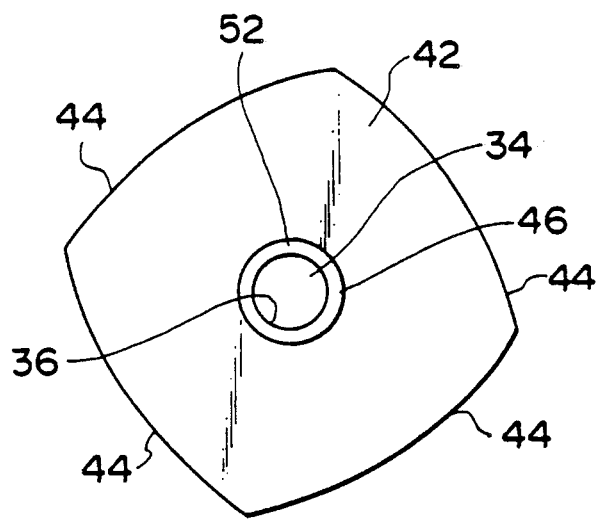
FIGS. 3A and 3B are schematic views showing one modification of the process illustrated in FIG. 2.
Figure 3B:
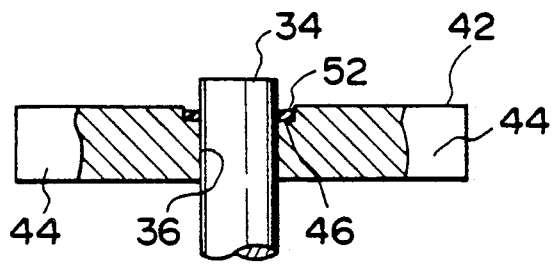

FIGS. 3A and 3B show a modification of the manner in which the motor shaft 34 and the polygonal mirror 42 are fixed to each other. According to this modification, an annular groove 46 is formed in that portion of the polygonal mirror 42 which is to be brought into contact with the shaft 34. By providing the polygonal mirror 42 with such a groove 46, the adhesive 52 is prevented from flowing out even if the amount of adhesive used is somewhat excessive or if the adhesive has a comparatively low degree of viscosity.

FIGS. 4A through 4C illustrate other modifications of the manner in which the motor shaft 34 and the polygonal mirror 42 are fixed to each other. In the case where the motor shaft 34 and the polygonal mirror 42 are adhered together by use of a UV-curing adhesive, at least part of the polygonal mirror 42 has to allow transmission of ultraviolet rays. In the example illustrated in FIG. 4A, the polygonal mirror 42 is formed of resin allowing transmission of ultraviolet rays, and ultraviolet rays are irradiated toward the UV-curing adhesive in the direction parallel to the axis of the shaft 34, as is indicated by the arrows in FIG. 4A. In the FIG. 4A example, a material 56 having a high reflectance, such as aluminum, is evaporated on each mirror surface 44, or a reflectance-improving agent 56, such as liquefied aluminum for brightening, is coated on each mirror surface 44. In the example illustrated in FIG. 4B, the polygonal mirror 44 is adhered to the seat 50 (a base member) of the rotor 38 fixed to the shaft 34. A plurality of small holes 48 used for introducing an adhesive 52 are formed in the polygonal mirror 42. In the FIG. 4B example, the distance between the shaft 34 and the polygonal mirror 42 (more specifically, the distance between the center of the shaft 34 and each mirror surface 44) can be adjusted in a desirable manner. The example shown in FIG. 4C differs from that shown in FIG. 4B, in that a screw 54 is used in place of the adhesive 52. In the FIG. 4C example, the polygonal mirror 42 can be easily replaced with another even if the polygonal mirror 42 or its mirror surfaces 44 are broken, scratched or damaged. In the case shown in FIG. 4B, the adhesive 52 is prevented from reaching the motor shaft 34 even if it flows out. Therefore, smooth rotation of the shaft 34 and rotor 38 and (accordingly, the polygonal mirror 42) is ensured. If necessary, the above-mentioned high-reflectance material 56 or reflectance-improving agent 56 may be applied on each mirror surface 44 even in the FIG. 4B and FIG. 4C examples as well.

According to the present invention, the polygonal mirror and the motor shaft can be very accurately positioned when they are fixed to each other, and they can be easily positioned with no need to use a complicated process. In addition, the number of parts or components required can be reduced, and the adjustment at the time of assembly can be simplified. Further, since a leaf spring, which would require a complicated design because of the change of the spring characteristic with time, needed not be employed, the time need for the design of the optical deflector can be shortened. As a result, the optical deflector can be reduced in both size and weight. Still further, the cost needed for the assembly and the cost for the structural components can be reduced remarkably.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An optical apparatus comprising:
   a deflecting member for deflecting a light beam, the deflecting member including resin and having non-planar surfaces for reflecting the light beam; said surfaces having a material which reflects the light beam at high reflectance;
   a rotating shaft for rotating the deflecting member; and
   a bonding agent member provided between the deflecting member and the rotating shaft so as to bond the deflection member to the rotating shaft.

2. An optical apparatus according to claim 1, wherein the reflecting surfaces have an evaporated high-reflectance material thereon.

3. An optical apparatus for deflecting a light beam comprising:
   a deflecting member for deflecting a light beam, the deflecting member having non-planar surfaces for reflecting the light beam and having introducing holes formed therein;

a rotating shaft for rotating the deflecting member, said shaft including a mount section for mounting the deflecting member thereon, and the introducing holes of the deflecting member being located at positions corresponding to the mount section of the rotating shaft; and a bonding agent member provided between the deflecting member and the rotating shaft so as to bond the deflecting member to the rotating shaft.

4. An optical apparatus comprising:

deflecting means for deflecting a light beam, said deflecting means including resin and having a reflecting surface, said surface having a material which reflects the light beam at high reflectance;

rotating means for rotating said deflecting means; and a bonding agent member provided between said deflecting means and said rotating means so as to bond said deflecting means to said rotating means.

5. An optical apparatus for deflecting a light beam, comprising:

deflecting means for deflecting the light beam, said deflecting means including resin and having a reflecting surface, said surface having a material which reflects the light beam at high reflectance;

rotating means for rotating said deflecting means, said rotating means including a mount section for mounting said deflecting means thereon; and a bonding agent member provided between said deflecting means and said rotating means so as to bond said deflecting means to said rotating means.

6. An optical apparatus for deflecting a light beam comprising:

a deflecting member for deflecting a light beam, the deflecting member having a non-planar surface for reflecting the light beam and the deflecting member being made of resin;

a rotating shaft for rotating the deflecting member, the rotating shaft including a mount section for mounting the deflecting member thereon;

a bonding agent member provided between the deflecting member and the rotating shaft so as to bond the deflecting member to the rotating shaft;

wherein the reflecting surface is coated with a material which reflects the light beam at high reflectance.

7. An optical apparatus according to claim 6, wherein the reflecting surface has an evaporated high-reflectance material thereon.

* * * * *